Figure 1:
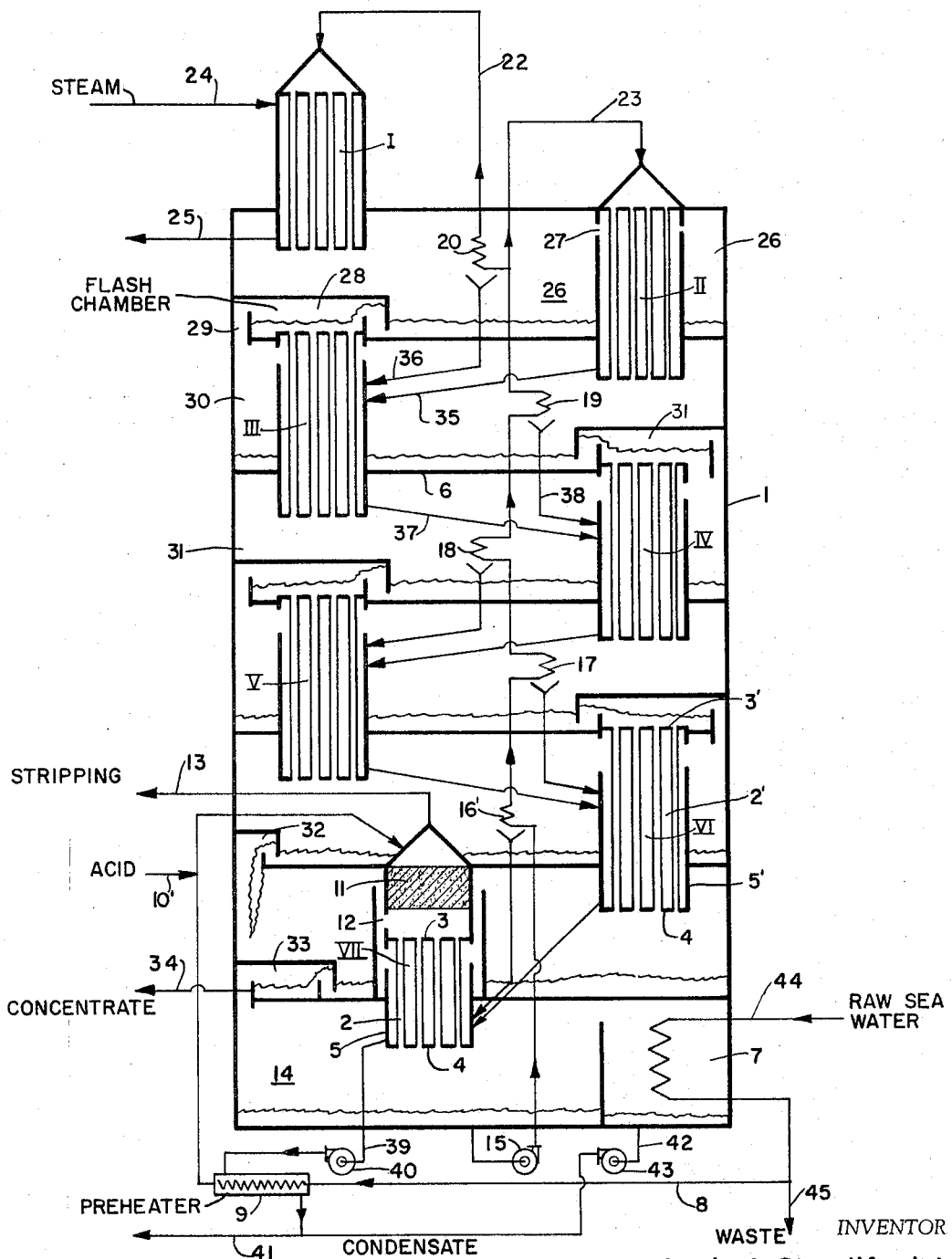

United States Patent Office 3,303,106
Patented Feb. 7, 1967

3,303,106
FALLING FILM EVAPORATOR
Ferris C. Standiford, Jr., Ann Arbor, Mich., assignor to W. L. Badger Associates, Inc., Ann Arbor, Mich., a corporation of Michigan
Filed Dec. 21, 1964, Ser. No. 420,489
10 Claims. (Cl. 203—27)

This invention relates to an improved evaporator of the falling film type which is to be used as part of a multiple effect system.

This particular evaporator involved herein, commonly known as the falling film type, employs bundles of relatively large diameter metal tubes on the outside of which vapors are condensed and the latent heat of vaporization derived therefrom is transmitted through the tube walls to heat and partially evaporate a liquid flowing as a film on the inside walls of the tubes. In order to reduce heat requirements, such evaporators are usually built as multiple effect units so that the vapor liberated in one effect is utilized as a heating medium for the next adjoining effect wherein boiling occurs at a lower temperature. Usually, condensing steam from an outside source need be supplied to only the effect operating at the highest temperature and only the effect operating at the lowest temperature will require a heat sink to condense the vapors generated in that effect.

In an evaporator of the falling film design some means must be employed to deliver liquid, to be subjected to evaporation, to the top entrance of the tubes in each effect. In order to achieve the optimum heat economy, and to provide sufficient liquid to adequately wet the tube walls, the feed liquid is usually passed through the effects connected for a series operation; the partially concentrated liquid effluent from one effect thereby becoming the feed for the adjoining effect.

Evaporators operated in this manner are termed backward feed if the liquid to be evaporated first enters the last effect, i.e., that effect operated at the lowest pressure; flowing thence countercurrent to the vapor flow and boiling at successively higher pressures.

In a so-called forward feed evaporator, exactly the reverse situation exists: the feed entering the effect operated at the highest pressure flows parallel to the vapor path and is caused to boil at successively lower pressures. Regardless of whether the flow of liquid is aided, as in forward feed, by the pressure differences between effects, or impeded, as would be the case when using a backward feed, pumps are usually needed to transfer liquid from one effect to another. This is ostensibly because the liquid issuing from the bottom of one effect must be raised to the height of the relatively long tubes of the next effect and delivered to the tops thereof. Should the effects be placed one above the other in an attempt to eliminate this pumping requirement, a great height would be needed to accommodate the cumulative length of the tubes in addition to the vapor-liquid disengaging space required at the bottom of the tubes of each effect.

It is therefore a primary object of my invention to provide an improved falling film evaporator operated as a multiple effect system wherein the effects are operated in series and are arranged one above the other so as to reduce the cumulative total height of the assemblage without any of the heretofore attendant disadvantages.

It is yet another object of the invention to provide an improved falling film evaporator, operated as a multiple effect system, wherein the various effects making up the system are so located as to eliminate most of the pumps usually needed to transfer the liquid from one evaporator to another. The resultant is to substantially reduce the overall power requirements.

Still another object of this invention is to provide an improved multiple effect falling film evaporator which may be constructed as an integral unit. Such improved design results in a substantial savings in construction costs, particularly by permitting a reduction in the space customarily occupied by the vapor-liquid separation zone.

Yet another object of this invention is to provide an integral multiple effect evaporator system which is particularly adapted to be used in large installations with high capacity output for the production of potable water from non-potable water.

Figure 2:
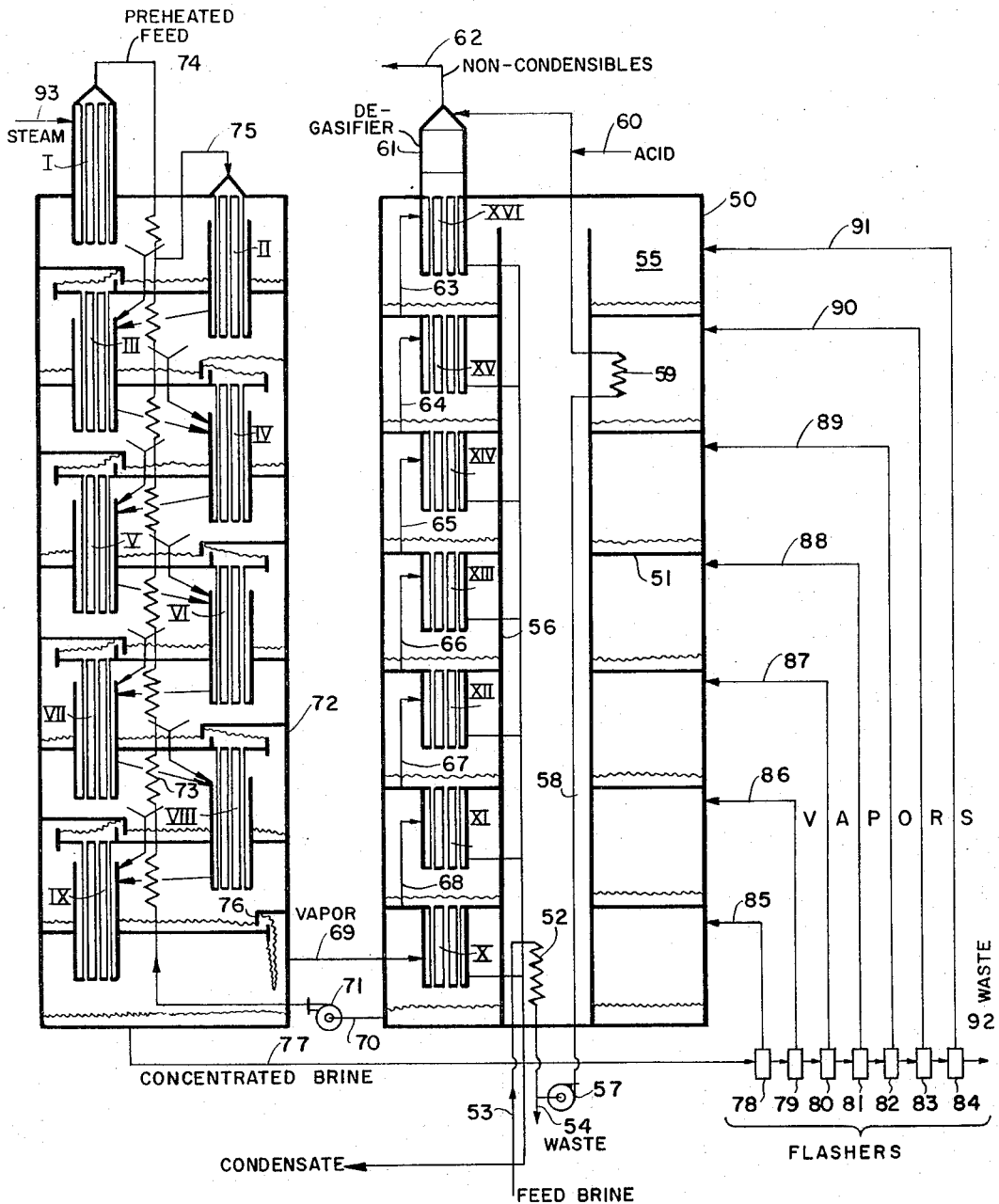
Figure 3:
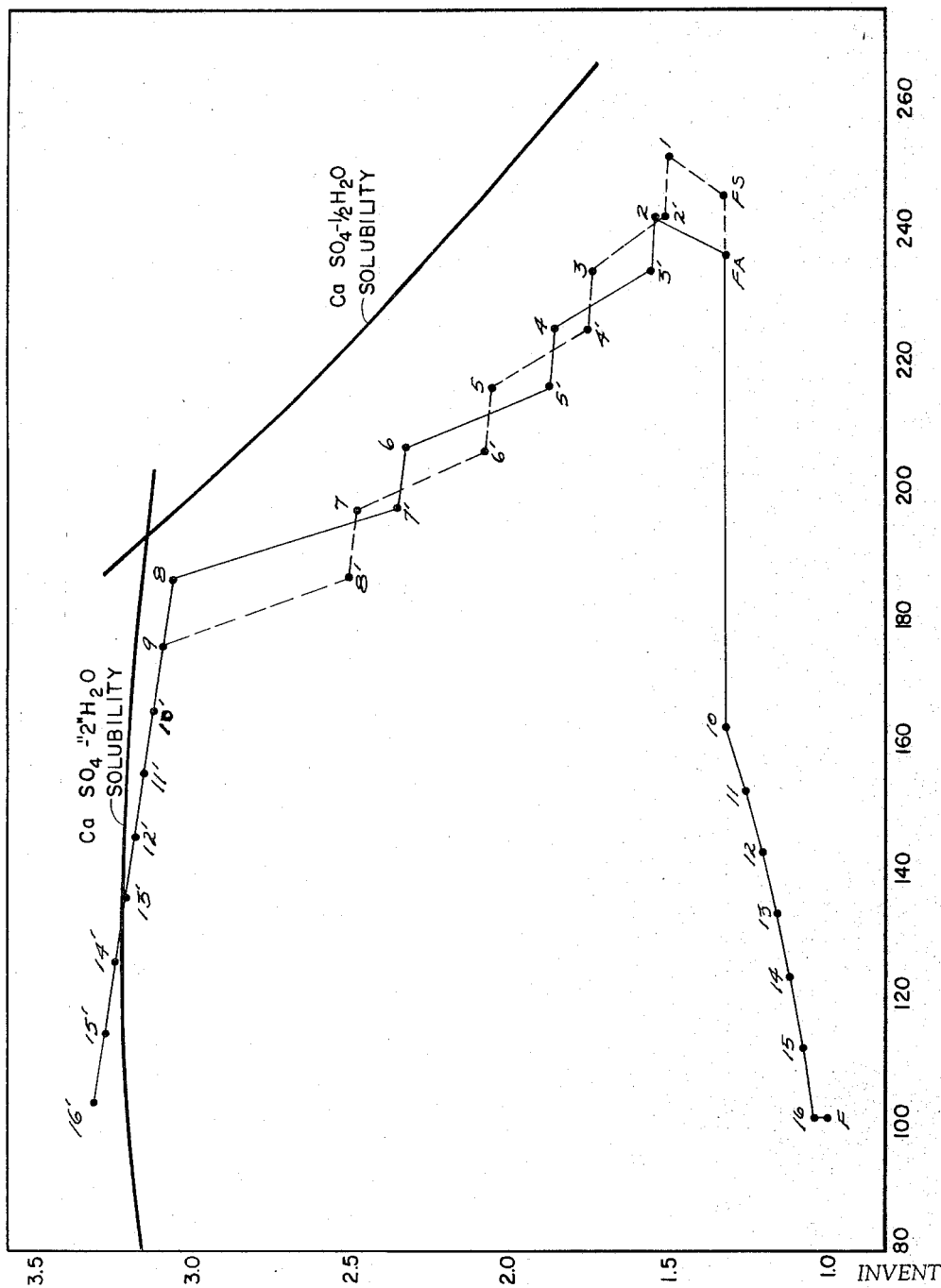

FIGURE 1 is a vertical sectional view of a multiple effect evaporator system with seven effects arranged one above the other in a single vessel using a split feed arrangement; this figure also illustrates, systematically, the flow of liquid and vapors to and from the various effects;

FIGURE 2 is a vertical sectional view illustrating a sixteen effect evaporator system arranged in two vessels, only one of which has a split feed sequence; and FIGURE 3 represents a plot of the solute concentration versus boiling temperatures in the array of evaporators illustrated in FIGURE 2 when the same are operated to obtain the maximum yield of fresh water from a sea water feed; this figure additionally has superimposed thereon a graphic representation of how such a mode of operation may be effectuated without subjecting the evaporator to any appreciable scale formation.

In FIGURE 1, all effects are shown contained in a single vessel 1, which for large plants, may be conveniently made of reinforced concrete covered with an impermeable membrane such as metal or plastic, or for that matter, any other suitable construction material.

For a sea water purification plant designed to make 50 million gallons of distilled water per day, vessel 1 is shown as an operation with seven effects. In the preferred operation of the invention, this would be approximately 180 feet high and 100 feet in diameter. The heating tube bundles used in each effect are denoted by Roman numerals I through VII, which, taken in the direction of the ascending numerals, indicates the direction of vapor flow and decreasing boiling temperatures. Although only one bundle of tubes is shown for each effect, as denoted by the respective Roman numerals therefor, it is to be understood that the instant invention revolves about the use of a multiplicity of such bundles, all having a common source of feed liquid and heating vapor, and all discharging into a common vapor-liquid separator chamber.

The tube bundles may conveniently take the form of conventional cylindrical shell-and-tube heat exchangers with the tubes 2 contained between upper 3 and lower 4 horizontal tube sheets and surrounded, about the lower portion thereof, by a shell 5 designed to channel the vapor flow and collect the condensate which is formed.

The chambers used to separate the vapors from the liquid in the effects are arranged, in the instant design, one above the other, and are separated by essentially horizontal partitions common to adjacent effects. These partitions, such as that between the separators of effects II and III, as denoted by 6, may also conveniently be made of reinforced concrete and supported by suitable integral columns in addition to the support provided by the walls of the vessel 1.

A surface condenser 7, of conventional design, is provided in the lowermost vapor liquid separation chamber of the evaporator and the raw sea water is supplied by line 44 as a cooling medium which serves to condense the steam generated in the seventh effect. As would normally be the case when using sea water at those temperatures usually encountered in the arid regions of the world, most of the sea water effluent from condenser 7 is discarded by line 45, only a portion thereof being taken as a feed to the evaporator.

This sea water feed may then be treated for the prevention of alkaline scales of usual formation (calcium carbonate and magnesium hydroxide) by decarbonation as described in U.S. Patent 3,119,752.

A like process is performed by preheating the feed line passing through heat exchanger 9 to substantially the boiling point of the last effect, and adding mineral acid by line 10. This is followed by a stripping operation in vessel 11 with a small amount of vapor being bled in through port 12 to the vapor space in the sixth effect.

Decarbonating vessel 11 may be of the conventional tray type, wherein such is filled with a packing material, as Raschig rings; the line 13 connected thereto carrying a mixture of steam, carbon dioxide, and air to a vacuum pumping system of conventional design.

The decarbonated, deaerated, sea water falls from vessel 11 to the top tube sheet 3 of the seventh effect and thence down the tubes as a film under evaporating conditions; the same being heated by vapor from the sixth effect. The vapor and unevaporated sea water issues from the tubes of the seventh effect and is discharged into the vapor-liquid separator 14 of the last effect. The vapor is condensed on the tubes of the final condenser 7.

Because of the low operating temperatures of the last effect, generally in the range of from about 100 to 125° F., an added pressure drop in the tubes will be encountered because the specific volume of the vapor generated therein is large. To avoid whatever excessive vapor velocities exist in the tubes of the last effect, it is desirable to use shorter tubes than would ordinarily be used in the other effects. In order to provide the necessary heating services, however, additional tubes must be incorporated in the tube bundle to effect the transfer of the desired amount of heat. The tube wall wetting problems incident to the use of a greater number of tubes has been obviated in the present design by feeding all of the entering sea water through the tubes of the last effect. This improved design will thus provide the needed assurance that there will be sufficient liquid present to adequately wet the walls of all the tubes.

The unevaporated liquid remaining after the passage through the tubes of the last effect is removed by a pump 15. The latter has its inlet so disposed as to receive liquid from the bottom of the evaporator. Such liquid is then heated regeneratively to a temperature approaching that of the heating steam. This is shown as a series of heaters 16 through 20, heated in turn by vapor issuing from all but the last two evaporators. Alternatively, the liquid could be heated partially by such vapor and partially by the condensates collected in the various effects.

After, during, or prior to such heating step, the partially concentrated sea water is split into two approximately equal streams denoted by lines 22 and 23. For very large plants, it may be desirable to use a separate pump and a separate set of regenerative heaters for each stream. This will, of course, reduce the pumping costs since one stream does not have to be pumped to as high an elevation as the other.

One branch of the split feed stream, that in line 22, is fed to the top of tubes of the first effect to be heated by steam from an outside source. This steam enters by line 24 and the condensate formed therefrom will generally be returned to its source as make up by line 25. A vapor liquid separation zone 26, lying below the tubes of the first effect, receives the vapor and liquid issuing therefrom and this vapor then serves as the heating medium for the second effect which is also fed by the effluent of effect VII through line 23. The partially concentrated liquid in separator 26 is caused to flow into a small flash chamber 28. The latter is connected by port 29 to the vapor space 30 of the second effect.

The liquid, upon entering chamber 28, and maintained at a reduced pressure, is flash cooled and the flash vapor thus generated is then used to heat the third effect before the residual sea water is fed to the tubes of the third effect. Similarly, the effluent from the tubes of the second effect is flashed to the pressure of the third effect in flash chamber 31 and the flash vapor so formed is used as part of the heat supply to the fourth effect.

In like manner, the residual liquid from the third effect is flashed to the pressure in the fourth effect vapor space and fed to the tubes of the fifth effect. At the same time, the residual liquid from the fourth effect tubes is flashed to the pressure in the fifth effect vapor space and then fed to the sixth effect tubes. Finally, the residual liquid from the fifth effect is flashed to pressure in the sixth effect vapor space at 32 and the remainder, plus the residual liquid from the sixth effect, is flashed to the seventh effect vapor space at 33. The latter steps provide for maximum recovery of water vapor before the sea water concentrate is discarded through line 34 which line carries away the dissolved salt impurities.

The distilled water, constituting the product of the entire evaporator system, comprises the water condensed on the evaporator tubes of effect II through VII, that condensed in final condenser 7, and also that condensed in regenerative feed heaters 16 through 20. Since most of this condensate is hot while the product is generally desired at relatively low temperatures, the heat can be removed from heat exchanger 9 and such used to heat the feed in the manner shown in FIGURE 1.

As for the collection of condensate through the system, water vapor condensed in the tube bundle II plus that condensed in heater 20 is passed through lines 35 and 36, respectively, to the condensing space in bundles 3 where it is flashed to the pressure of the second effect vapor space. It is this condensate plus the vapor condensed in bundle III and in the heater 19 which is to be passed through lines 37 and 38 to the condensing space of bundle IV to yet again by flashed to the pressure of the third effect vapor space.

The accumulating condensate in the tube bundle is likewise flashed down in successive stages of reduced pressure, ultimately to the pressure of the sixth effect for that of the final condenser. Whatever flashing may occur in the final condenser produces no additional distilled product but may, however, increase the requirement of the final condenser. This latter flashing step may be omitted if warm product water is not objectionable.

Alternatively, the combined condensate from tube bundle VII may be cooled in heat exchanger 9 by heat transfer contact with the sea water feed to the deaerator as shown in FIGURE 1 by passing condensate from bundle VII through line 39 and pump 40 to heater 9. The cooled distillate product leaves the plant via line 41 along with the distillate formed in the final condenser 7 which is removed therefrom to line 41 by connecting line 42 and pump 43.

It is to be realized that many alterations are possible in the arrangement of the regenerative feed heater circuit and also in the method of recovering heat from the condensed vapors. That system shown in FIGURE 1 typifies merely one suitable arrangement and is therefore not meant to limit the scope of this invention. Further, it is not intended that the relative elevations of the flashing steps be limited to those as shown in FIGURE 1. For that matter, it is generally advisable to carry out the various flashing steps at the highest elevation possible so that the unflashed liquid remaining can be removed either without a pump, or with a pump having a lower power consumption.

Although the system depicted in FIGURE 1 illustrates the flashing of condensate and partially concentrated liquid through only a relatively small number of steps, it is obvious that even higher evaporator efficiencies can be attained when the flashing is performed in smaller steps. For example, feed heater train 16 through 20 can be broken up into an even larger number of smaller heaters which may be supplied, in whole, or in part, by vapor generated from flashing of condensate or partially concentrated liquids, or both, in a corresponding number of flashing stages (as in a multistage flash evaporator). Additionally, it is contemplated as within the scope of my invention that all of the sea water may be passed through several effects, such as the seventh effect shown herein, before the feed is split.

FIGURE 2, illustrating an alternative form of my invention, shows an application thereof amenable to an evaporative system with a larger number of effects which justifies the attendant higher construction costs. Such a plant, where all of the effects cannot conveniently be contained in one vessel, is plausible economically because of the reduced heat consumption required therein. The nine highest temperature effects, as illustrated on the left hand side, are constructed according to my invention and the remaining seven effects on the right are built as a conventional backward feed evaporator except that the effects are superimposed one above another. Relatively short tubes are used in the backward feed section since each effect is fed with all of the sea water concentrate available. In the split feed section, however, relatively long tubes are needed since each effect is fed with only half the available sea water concentrate which requires a lesser number of tubes to insure adequate wetting.

The backward feed section of the evaporator may conveniently be constructed in a vertical cylindrical vessel 50 of reinforced concrete with the vapor spaces separated by horizontal partitions such as exemplified by separator 51 between the thirteenth and fourteenth effects.

As also shown in FIGURE 2, only the major heat transfer equipment is referred to, the various condensate collection and condensate heat recovery stages being omitted for the sake of clarity.

Sea water, a portion of which is used as feed, is brought into the system through line 53 to be used to cool the final condenser 52 and is thence discharged out line 54. In order to avoid pumping the sea water coolant near the top of the structure and contiguous with the effect XVI, a cylindrical conduit 56, axially located in vessel 50, is in vapor connection with the effluent from the last effect so that the condenser 52 may be placed at a low elevation. A portion of the sea water coolant from condenser 52, to be used as feed for the evaporators, is taken off by pump 57 to heater 59, via line 58, where a portion of the vapor from the fifteenth effect is used to heat this feed substantially to the temperature of the last effect. This warmed sea water is then acidified with acid from line 60, decarbonated, and deaerated by the upper segment of vessel 61 in a manner similar to that shown in FIGURE 1. The water vapor, air and carbon dioxide liberated in the vessel 61 are then removed therefrom by line 62.

The resultant treated sea water is then partially evaporated in passing through the tube bundles of effect XVI and heat is supplied to the tube bundle of this evaporator by steam from the fifteenth effect. The steam used to heat the sixteenth effect is introduced by line 63, and the mixture of vapor and residual liquid effluent from the tubes of effect XVI is separated in chamber 55, the vapor going to condenser 52 and the liquid feeding the tubes of bundle XV. Evaporation proceeds in a similar manner through the remaining effects of vessel 50, e.g., the liquid advances by gravity to the effect below and the vapor passes to the effect above through lines 64 through 68 inclusive.

The lowermost effect in this section, shown as effect X, in FIGURE 2, is heated by vapor carried by line 69 from vessel 72 and the unevaporated liquid residue is withdrawn through line 70 by pump 71.

The discharge of pump 71 constitutes the feed to the split feed portion of the evaporator contained in vessel 72. This feed is heated in a regenerative feed heating circuit, generally denoted by reference numeral 73, in a manner similar to that shown in FIGURE 1, and the same is split into two streams 74 and 75. These feed the first and second effects respectively. The flow of vapor, condensates, and partially concentrated sea water through the various effects in vessel 72 is similar to that through the stages of FIGURE 1.

Considering now the evaporation steps appearing in the lowermost portions of vessel 72, the residual liquid from effect VIII is flashed to the vapor space of the ninth effect at 76, the resulting concentrate being then combined with the residual liquid from the ninth effect and the mixture removed by line 77. The vapor issuing from the tubes of the ninth effect is then taken through line 69 so as to serve as a heating medium for the tenth effect in vessel 50.

The vapor from the ninth effect is removed by line 69 to serve as heating medium for the tenth effect in vessel 50. In order to recover both the product water and the heat from the concentrated sea water leaving via line 77 from effect 9, the sea water is flashed in successive stages to the various pressures in effects X to XVI in the chambers denominated as 78 through 84, inclusive. The resultant vapors are then introduced to the corresponding effects as well as the condenser 52 by lines 85 to 91, inclusive, and the final cooled concentrated waste sea water is discarded by lines 92. Normally, in order to provide a more compact unit, flash chambers 78 through 84 would be built inside vessel 50 rather than externally, as shown at FIGURE 2.

FIGURE 3 typifies a path of both the temperature and concentration of the sea water as it passes through the evaporator effects of FIGURE 2. Also, the plot of the graph of FIGURE 3 is intended to illustrate particularly that the operation, in the manner described, will not expose the evaporator to scale formation.

It is assumed that the plant of this invention is designed to use decarbonation, as shown, to prevent alkaline scaling so that the only remaining scale possible is calcium sulfate. In the graphical representation of the operation of this invention, the temperature is plotted on the abscissa against a concentration factor on the ordinate; the latter being the ratio of dissolved solids concentration in the sea water concentrate to the dissolved solids concentration in normal sea water (3.5 percent by weight).

Superimposed on this diagram of FIGURE 3 is the solubility plot for calcium sulfate in sea water. Such illustrates the concentration at which a sea water concentrate first reaches saturation with respect to calcium sulfate due to its content of calcium and sulfate ions (assuming the latter has been augmented slightly by use of sulfuric acid for decarbonation).

The solubility diagram is shown for two crystalline forms of calcium sulfate, gypsum ($CaSO_4 \cdot 2H_2O$) and hemihydrate ($CaSO_4 \cdot \frac{1}{2}H_2O$). There is a third crystalline form, anhydrite ($CaSO_4$) that is even less soluble than the two forms shown on the diagram but it crystallizes with such difficulty at temperatures below at least 250° F., that it usually is not encountered as scale.

Because of the break in the calcuim sulfate solubility curve, high concentrations can be endured only at low temperatures while high solution temperatures can be tolerated only at low concentrations of calcium sulfate, if scaling is to be avoided.

However, high temperatures are desirable in an evaporator as means of economizing heating surfaces and hence capital cost. At the same time, high concentrations may also be desirable since they permit maximum recovery of fresh water from a given quantity of sea water. Hence it follows that a minimum amount of decarbonating acid is required which is proportional to sea water usage.

The path of evaporation plotted in FIGURE 3 shows the approximate course of boiling temperature against discharge concentration for each effect as the sea water passes through the effects in the evaporator of FIGURE 2 when it is heated by steam at 20 p.s.i. Here boiling occurs in the last effect at a vacuum of 1.5 inches of mercury, absolute.

In the mode of operation contemplated, employing the above conditions, the sea water is heated to approximately 90° F. in the final condenser (52 of FIGURE 2) and then heated substantially to the boiling temperature in the last effect in heater 59 of FIGURE 2 as shown by point F on the plot. This preheated water is then decarbonated and evaporated in the last effect to a concentration factor denoted by point 16. The sea water is then fed backward through the last seven effects, boiling at increasing temperatures and at increasing concentration factors as denoted by points 15 through 10.

The effluent from the tenth effect, at a temperature of approximately 163° F. and a concentration factor of about 1.32, constitutes the feed to my split feed evaporator. This solution is then heated regeneratively in heater 73 of FIGURE 2, and as shown by the horizontal line on the plot, to temperatures near those of the first and second effects. Such is denoted by points FA and FS.

The liquid is then split into two streams. In this case, the streams are of unequal size since one stream feeds five effects in series and the other stream feeds only four effects. The point FA, representing the smaller of the two streams, is separated before the final feed heater and fed to the second effect where evaporation causes the concentration factor to increase to that shown by point 2. The discharge from the second effect is then flashed to the pressure of the third effect, designated by point 3', which in turn is fed to the fourth effect. Here the temperature falls and the concentration factor rises to that shown by point 4. The liquid is then flashed to the fifth effect pressure 5', fed to the sixth effect designated by point 6, flashed to the seventh effect and this is followed by passing same to the eighth effect designated by point 8. The discharge from the eighth effect is then flashed to the pressure of the ninth effect and then combined with the ninth effect discharge (point 9).

Similarly, the remainder of the heated effluent from the tenth effect (FS) is fed to the first effect and partially concentrated to the value corresponding to point 1, flashed to the pressure of the second effect (point 2'), fed to the third effect (point 3), and so on until it leaves the ninth effect at the concentration and temperature designated by the reference point 9 where it is combined with the flashed eighth effect discharge. The combined sea water concentrate has now made its last contact with the heating surfaces that might become fouled by scaling and, as can be observed on the graph on FIGURE 3, the salt concentration in these bottoms is still below the solubility curve of the calcium sulfate and hence is unsaturated therewith.

The combined concentrate is then flashed down in stages through the pressures of the remaining effects, designated herein by points 10' through 16'. In these latter flashing steps, the concentration factor may be allowed to go beyond saturation with respect to calcium sulfate in order to achieve maximum possible recovery of water. Since flashing in these later stages occurs rather rapidly, there is little time for calcium sulfate, in excess of saturation, to deposit, and what is deposited cannot retard heat transfer and hence inhibit the capacity of the plant.

As can be seen from FIGURE 3, and from the above discussion with reference to the device illustrated herein and mode of operation of same, the instant invention permits the evaporator to work at high initial temperatures as well as at the highest possible salt concentration without any risk of scale formation on the heating surfaces. These factors, translated into the economies of evaporator operation, means that firstly: only a minimum amount of heating surface for a given output are needed when high initial temperatures are permitted; and secondly: only a minimum amount of sea water for a given amount of product need be pumped through the system when the concentration of same may be increased to a point approaching the solubility of the salts contained therein.

It can readily be seen that by following the practice taught by my invention, very long tubes may be used in a falling film evaporator with superimposed effects while the height per effect remains substantially less than the combined length of the tubes. For instance, using 35 foot long tubes and a 10 foot vapor-liquid disengaging space below the tubes, the total height of an effect would normally be 45 feet. Yet by employing my invention, half of this height can be shared by adjacent effects, thusly reducing the height required by at least fifty percent. It can further be realized that, by using three separate feed streams, each intermediate stream skips not only one, but two effects, and the overall height can be reduced even further.

It is not intended that my invention be restricted to specific means of distributing feed liquid uniformly to the walls of all the tubes of each effect of my evaporator. Various means may be used to distribute the feed liquid to the walls at the tops of the tubes in my evaporator and, at the same time, to so restrict the flow that only liquid and no vapor enters the tubes (other than the vapor formed by flashing of the liquid as it passes the restriction). An example of a device commonly used for this purpose is that described in U.S. Patent 2,424,441. It is also contemplated to be within the scope of my invention to employ the feed distribution means described in my co-pending application No. 415,343, entitled "Feeding Method for Falling Film Evaporators," filed Dec. 2, 1964, to secure both improved feed distribution and higher heat transfer performance.

I claim:

1. In a multiple effect falling film evaporator system having vapor-liquid disengaging chambers of successive effects stacked one below the other in order of decreasing boiling pressure from top to bottom, the method of evaporating a feed solution comprising splitting the feed into two streams, said streams following a juxtaposed first and second liquid flow path, passing the first of said streams to the highest effect along the first flow path, passing the second of said streams to the highest effect of the second flow path and along the same, passing the unevaporated liquid from the highest effect in the first flow path to the second highest effect along the first flow path, and passing the unevaporated liquid from the highest effect in the second flow path to the second highest effect along the second flow path.

2. The method of claim 1 in which the unevaporated liquid from a higher pressure effect prior to its passage into the next lower effect in the same path is flashed to provide heating vapor for said next lower effect in the same path.

3. The process as defined in claim 1 wherein a flashing system is provided which removes unevaporated liquid from the last effects in the first and second paths and flashing said unevaporated liquid successively into pressure staged vapor communication with vapor-liquid effluents from each of corresponding effects in another set of vertically stacked falling film evaporators.

4. In an evaporation system comprising two adjacent descending liquid flow columns each composed of a tubular type falling internal film multiple effect evaporator, the tubular type heat transfer surfaces of which are superposed one below the other with respect to liquid flow, the first column operating in counterflow with respect to vapor flow and the second column itself being subdivided into two vertical ranks of multiple effect forward flow evaporator effects, the method of evaporation comprising (1) passing feed solution to be evaporated through said first counterflow column to obtain a first concentrate; (2) dividing this concentrate into two parts, (3) further concentrating each of the two parts by passing each part through a respective one of the two subdivided vertical ranks of the second column, (4) passing the vapors generated in each effect in each rank to the next lower effect in the adjacent rank to act as heating medium in the latter, and (5) passing the vapor released in the lowest effect in the second column to the initial effect with respect vapor flow in the first column to act as heating medium in said initial effect.

5. The process as defined in claim 4 further characterized in that effluent from the highest effect in said first column is in vapor communication, through a vertically arranged cylindrical conduit rising axially in said first column from the bottom thereof to its highest portion with a condenser cooled by entering feed solution and which is positioned at the lowermost end of said conduit whereby the vapor fraction of said effluent is condensed.

6. The process of claim 4 in which the final concentrates from the two ranks in the second column are (1) combined and (2) flashed through a succession of decreasing pressure stages equal in number to the number of effects in the first column, (3) the separate vapors from the flashing stages being distributed to the vapor spaces of the effects in the order of pressure decrease.

7. The method of claim 4 further characterized in that the first column has a cental, vertical, upper open ended duct rising from the bottom of the first column and terminating in the uppermost, lowest pressure stage and a condenser at the bottom of the duct, said method further comprising passing the vapors released in said uppermost, lowest pressure stage down through said duct and condensing them in said condenser.

8. A process for operating a falling film evaporator as a multiple effect system comprising passing feed liquid to a first backward feed multiple effect section, and passing the unevaporated residue of the feed liquid therefrom to a split, vertically arranged, forward feed multiple effect second section having two parallel flow ranks.

9. The process as defined by claim 8 wherein the vapor generated in the first effect of one rank of said second section is used to evaporate liquid in the first effect of the other rank but positioned at a level below the first effect of said one rank, and the residual unevaporated liquid from the first mentioned effect is used as feed for the second effect in said one rank and positioned below said first mentioned effect.

10. A falling film multiple effect evaporator system comprising a hollow column divided by horizontal partitions, including the uppermost and lowermost column closing ones, into a plurality of superimposed chambers; two vertical, adjacent and staggered arrays of vertical, tubular type, falling internal film heat exchanger means, each with its surrounding steam chest and each penetrating one partition so that its tube outlets lie below said partition and above the next lower partition to discharge their effluent thereupon and so that its tube inlets, except for the two uppermost effects, are coplanar with the partition immediately above the penetrated partition; the two uppermost effects, one in each array, having their respective inlets opening into separate, respective and independent chambers; the lowermost, column closing partition being free of heat exchanger penetrations and the chamber immediately thereabove being subdivided by a vapor passing partition into two subchambers, segregating the effluent from the lowermost heat exchanger means into liquid and vapor portions; each steam chest, except the uppermost, having openings admitting vapor released from the effluent of the next higher heat exchanger means in the adjacent array; the uppermost heat exchanger means having a separate heating medium inlet; a vapor condensing heat exchanger in the subdivided vapor segregating chamber for condensing the flashed vapors released therein, through which exchanger raw feed is passed and preheated, a conduit conveying the preheated feed to the lowermost heat exchanger means and a pump forcing the liquid portion of the effluent of the lowermost heat exchanger means from the subdivided liquid segregating chamber to the uppermost heat exchanger means in each array and conduits conveying the condensate from each steam chest to the next lower steam chest in the adjacent array.

References Cited by the Examiner

UNITED STATES PATENTS

| | | | |
|---|---|---|---|
| 780,612 | 1/1905 | Meyer | 159—13 |
| 1,200,996 | 10/1916 | Soderlund et al. | 159—13 X |
| 1,867,076 | 7/1932 | Hughes et al. | 202—174 |
| 2,334,959 | 11/1943 | Rosenblad | 159—13 |
| 2,413,292 | 12/1946 | Christensen | 159—18 X |
| 2,609,334 | 9/1952 | Pyle et al. | 203—40 |
| 2,803,589 | 8/1957 | Thomas | 202—174 |
| 3,165,452 | 1/1965 | Williams | 203—11 |
| 3,198,241 | 8/1965 | Baird | 159—13 |
| 3,218,244 | 11/1965 | Checkovich | 203—11 X |

NORMAN YUDKOFF, *Primary Examiner.*

J. SOFER, *Assistant Examiner.*